United States Patent
Kahle

(10) Patent No.: US 7,168,328 B2
(45) Date of Patent: Jan. 30, 2007

(54) MEASURING DEVICE FOR DETERMINING THE MASS RATE OF FLOW OF A MASS FLOW

(75) Inventor: Jens Kahle, Dreieich (DE)

(73) Assignee: Schenck Process GmbH, Darmstadt (DE)

( * ) Notice: Subject to any disclaimer, the term of this patent is extended or adjusted under 35 U.S.C. 154(b) by 82 days.

(21) Appl. No.: 10/535,023

(22) PCT Filed: Nov. 12, 2003

(86) PCT No.: PCT/EP03/12646

§ 371 (c)(1),
(2), (4) Date: May 13, 2005

(87) PCT Pub. No.: WO2004/044533

PCT Pub. Date: May 27, 2004

(65) Prior Publication Data

US 2006/0042401 A1 Mar. 2, 2006

(30) Foreign Application Priority Data

Nov. 13, 2002 (DE) .............................. 102 53 078

(51) Int. Cl.
G01F 1/82 (2006.01)

(52) U.S. Cl. ............................................... 73/861.353
(58) Field of Classification Search ........... 73/861.353, 73/861.73, 861.354, 862.08
See application file for complete search history.

(56) References Cited

U.S. PATENT DOCUMENTS

| 4,574,896 A | 3/1986 | Friedrich |
| 4,700,578 A | 10/1987 | Fassbinder |
| 5,088,331 A | 2/1992 | Fassbinder |
| 5,191,802 A | 3/1993 | Fassbinder |

(Continued)

FOREIGN PATENT DOCUMENTS

DE 33 46 145 7/1985

(Continued)

*Primary Examiner*—Jewel Thompson
(74) *Attorney, Agent, or Firm*—W. F. Fasse; W. G. Fasse

(57) ABSTRACT

The invention relates to a measuring device for determining the mass rate of flow of a mass flow, especially for measuring a flow of bulk material. An impeller wheel (2), which is connected to the drive shaft (3) and which is driven at a constant rotational speed, is thus provided. The impeller wheel (2) deviates an axially impinged mass flow in a radial direction and provides it with a radial and tangential speed component. The drive shaft (3) includes a spur-toothed wheel (11) which engages with an intermediate spur-toothed wheel (21) and which is driven by a driving spur-toothed wheel (20, 31). The intermediate spur-toothed wheel (21) is mounted on a force transmitting arm (24) which is maintained in a radial position by a force measuring device. The drive shaft (3) is surrounded by a bearing bushing (4) which protrudes into the housing area (1) of the impeller wheel (2) and which is driven by a separate driving means (19, 32) at a rotational speed which corresponds to the rotational speed of the drive shaft (3). The bearing bushing (4) is rotatably mounted in a fixed part of the housing, such that basically no relative speed occurs between the drive shaft (3) and the bearing bushing (4).

11 Claims, 3 Drawing Sheets

U.S. PATENT DOCUMENTS

| | | | |
|---|---|---|---|
| 6,122,977 A * | 9/2000 | Soderholm et al. | 73/861.354 |
| 6,138,518 A * | 10/2000 | Strubbe | 73/861.73 |
| 6,185,983 B1 * | 2/2001 | Soderholm et al. | 73/1.34 |
| 6,210,115 B1 * | 4/2001 | Soderholm et al. | 416/183 |
| 6,705,171 B1 | 3/2004 | Toerner | |
| 2004/0011142 A1 | 1/2004 | Brotzmann et al. | |

FOREIGN PATENT DOCUMENTS

| | | |
|---|---|---|
| DE | 35 07 993 | 9/1986 |
| DE | 39 40 576 | 6/1991 |
| DE | 199 05 951 | 8/2000 |
| DE | 100 41 433 | 3/2002 |
| EP | 0 474 121 | 3/1992 |
| GB | 739 840 | 11/1955 |

* cited by examiner

MEASURING DEVICE FOR DETERMINING THE MASS RATE OF FLOW OF A MASS FLOW

The invention relates to a measuring device for determining the throughflow rate of a mass flow particularly for measuring a bulk material flow according to the preamble of patent claim 1.

In practice, feed advance belt scales, measuring chutes, bounce plates or measuring devices based on the Coriolis principle are used for the continuous ascertaining of the throughflow rate of material flows. Particularly for the high precision measuring of bulk material such as granular materials well flowing powders, grains and other materials mass throughflow measuring devices are preferably used which operate in accordance with the Coriolis principle. These mass throughflow devices use the Coriolis force for determining the flow rate which force occurs while transporting bulk material particles through a rotating impeller wheel. Thereby, the impeller wheel comprises impeller blades arranged in a star shape through which the bulk material is accelerated outwardly. The impeller wheel rotates with a constant angular velocity. The Coriolis acceleration which occurs when the bulk material particles are moving, imposes a moment on the measuring wheel which moment is proportional to the mass flow rate. Thus, this measuring method is suitable to ascertain bulk materials material flows with a high precision because, contrary to bouncing plates and measuring chute systems, there is no physical value influenced by the characteristics of the bulk material which enters into the sensitivity of the apparatus. However in connection with Coriolis measuring devices, there is the problem that the Coriolis forces produced by the mass flow are very small relative to the adverse forces resulting from the radial acceleration so that the precision depends very much on the decoupling of the adverse forces from the measuring train.

A known measuring device for ascertaining the mass throughflow of bulk materials in accordance with the Coriolis principle is known from German Patent publication DE 33 46 145 C2. That measuring device comprises an impeller wheel with radially extending impeller blades which are arranged on a horizontal plate. The impeller wheel is connected with a drive shaft which is driven by a motor with a constant rpm. The motor is rotatably mounted by two ball bearings and props itself up on a force transducer which ascertains the drive moment. In principle, the drive moment is proportional to the mass flow and can be displayed in an evaluating unit as feed rate or as feed quantity. However, in this rotatably arranged measuring train including the force measuring device, the rotatably mounted drive motor and the driven impeller wheel, there occur in the ball bearings as well as in the seals of the drive shaft, frictional forces which are included in the measured value and thus may lead to measurement inaccuracies particularly when the friction values are changing.

A further mass flow rate measuring device operating in accordance with the Coriolis principle is known from European Patent publication EP 0 474 121 B1. That device comprises a measuring gear in the drive train for reducing the friction forces. For this purpose the drive shaft of the impeller wheel is led to the measuring gear housing through a stationary sleeve. A drive spur gear wheel is secured to the drive shaft in the measuring gear housing. The drive spur gear wheel meshes with an intermediate spur gear wheel and with a drive spur gear wheel which is secured to the drive shaft of the motor. The intermediate spur gear wheel is suspended in a tangentially movable manner and connected to a force measuring device which ascertains the tangential force which is proportional to the mass throughflow. In order to avoid friction forces in the measuring train the drive shaft is secured below the drive spur gear wheel in an anti-friction bearing. The inner ring of the anti-friction bearing is connected with the drive shaft and the outer ring of the anti-friction bearing is connected with the inner ring of a second anti-friction bearing. Thereby, the outer ring of the first anti-friction bearing is separately driven by additional spur gear wheels whereby a drive rpm is suggested which corresponds at least to the drive rpm of the drive shaft. As a result, only the friction force of the first anti-friction bearing in the measuring train is compensated whereby the drive shaft rotating with a high rpm in the sleeve is likely to cause additional bearing frictions. In practice, this bearing friction in the sleeve to the bulk material housing section is kept small by air bearings as disclosed in German Patent publication DE 35 07 993 C2. However, such air bearings require a very high manufacturing effort and expense and a separate pressurized air connection. However even in connection with such air bearings frictional influences are not excluded particularly if unilateral radial accelerations occur due to strongly varying mass flow changes or due to non-uniform loading of the impeller wheel. Such non-uniform loading imposes an imbalance on the impeller wheel whereby the drive shaft may contact the support sleeve. Furthermore, pressure variations in the bulk material container may lead to the penetration of the bearing area by strongly abrasive bulk material dusts whereby friction changes may occur in the measuring train.

A Coriolis measuring device for ascertaining of bulk material flows is known from German Patent publication DE 100 41 433 C2 in which the drive shaft is surrounded by a stationary sleeve extending from the measuring gear drive housing into the bulk material housing. Evidently, the stationary sleeve forms a bearing housing of a slide bearing. This bearing housing is extended into a precisely fitting recess in the impeller wheel plate so that the drive shaft bearing is substantially protected against entering of bulk material dusts. However, the transition from the bearing sleeve to the drive shaft must additionally be closed in a dust tight manner whereby an additional friction occurs in the measuring train which friction also depends on the size of the bulk material flow. Further, the drive shaft also rotates with a relatively high rpm in the stationary bearing sleeve whereby an additional load depending bearing friction is generated in the measuring train. These friction influences present in the measuring train cannot be maintained constant due to variable temperature influences, due to entering bulk material dusts and due to a non-uniform impeller wheel loading. Thus, these frictional influences cannot be completely compensated by a calibration whereby the measuring precision can change due to these friction influences.

It is the object of the invention to improve the measuring precision of mass flow measuring devices operating in accordance with the Coriolis principle and to particularly maintain the measuring precision at least constant even when different operating procedures and environmental conditions occur.

This object has been achieved by the invention as defined in patent claim 1. Further developments and advantageous embodiments of the invention are defined in the dependent claims.

The invention has the advantage that between the support sleeve that reaches into the impeller wheel housing space, and the drive shaft almost no relative velocity occurs so that in this part of the measuring train there is no need for a sealing that can cause friction. As a result, even if abrasive bulk material dusts enter or when large temperature changes occur in the bulk material, no additional friction can occur which could change the measuring precision. Simultaneously this feature has the advantage that it is not important to have a mounting with expensive anti-friction or air bearings in order to achieve an almost friction free mounting and basically constant environmental conditions are also not important. Since the measuring train is decoupled by the driven sleeve in a friction sense, the bearing friction forces of the sleeve cannot falsify the measuring result relative to the housing nor relative to the drive shaft. This feature also has the advantage that the mounting of the driven sleeve can be accomplished with simple means and no special attention to the friction of the sealing between the bulk material housing and the bearing sleeve is required so that also simple friction exposed sealings can be used. Since the measuring train extends friction free from the impeller wheel through the drive shaft to the drive spur gear wheel, no torque moment variations can occur even during idling whereby a high zero point constancy is achievable. Such zero point constancy makes it possible in an advantageous manner to use a small diameter drive spur gear wheel with a large force transmission to the measuring device whereby a high measured signal resolution is achievable.

In a special embodiment of the invention it is provided to construct the support of the drive shaft in the sleeve with spring elements which are soft to bending in the rotational direction and hard against bending in the radial direction. This feature has the advantage that no bearing play and no friction moments can occur at the beginning of a small relative motion between the drive shaft and the support sleeve. As a result, it is possible that even for very small throughflow rates or small mass flow variations high measuring precisions are achievable. This feature simultaneously has the advantage that the measuring device is also operable in a very large temperature range because small relative motions, particularly at very low temperatures, cannot cause any friction between the drive shaft and the support sleeve. As a result, a high measuring precision is achievable also over a large temperature range.

The invention will now be explained in more detail with reference to an example embodiment which is shown in the drawing.

Figure 1:
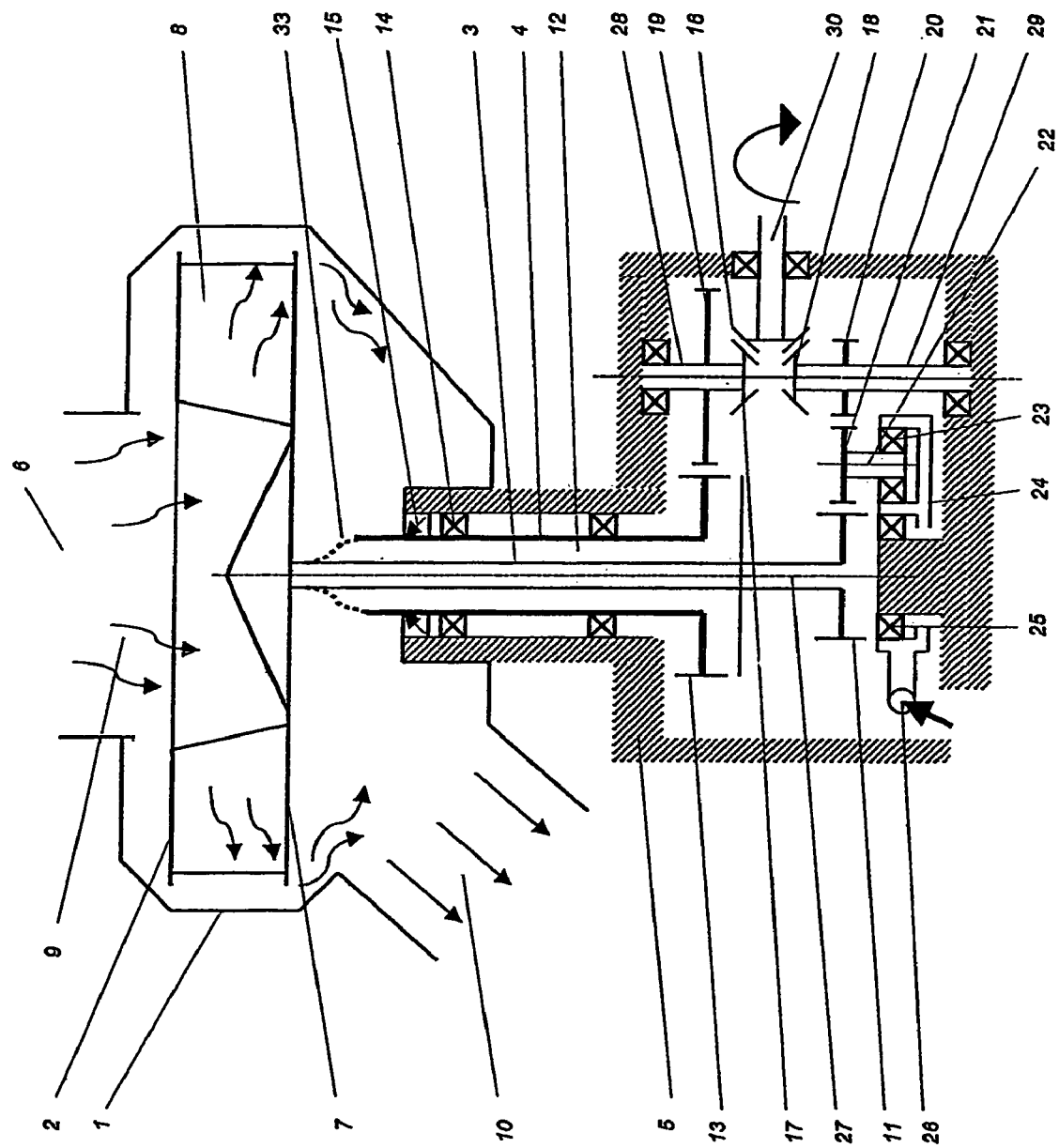
FIG. 1 shows a sectional side view schematically illustrating a measuring device with a drive shaft mounted by slide bearings.

FIG. 1 of the drawings illustrates schematically a measuring device for ascertaining of bulk material flows in accordance with the Coriolis principle. Essentially, the measuring device comprises a housing section 1 in which an impeller wheel 2 rotates and a driving and measuring device arranged therebelow. The drive shaft 3 reaches through a driven support sleeve 4 into the impeller wheel housing 1. The support sleeve 4 is rotatably mounted in a stationary gear drive housing.

During a measuring operation the bulk material flow 9 is axially admitted as a mass flow to the impeller wheel 2 through an entrance opening 6. The impeller wheel 2 comprises a horizontally arranged disc 7 with radial guide blades 8 whereby the axially admitted bulk material 9 is deflected radially outwardly. The impeller wheel rotates with a constant rpm and accelerates the bulk material flow 9 radially outwardly whereby, due to the Coriolis force, a brake moment is generated which is proportional to the mass flow 9. For achieving a dust sealed measuring operation, the impeller wheel 2 is mounted in an enclosed housing section 1 which has in its lower portion a lateral discharge opening 10 through which the measured bulk material 9 is feedable to a following process.

The impeller wheel 2 is constructed to have a rotational symmetry and includes a central drive shaft 3 which is mounted vertically and which comprises at its lower end a drive spur gear wheel 11. The drive shaft 3 is coaxially surrounded by a support sleeve 4 which extends from the impeller wheel housing to the measuring gear drive housing 5 positioned below the impeller wheel housing. The support sleeve 4 is constructed as a tubular shape and extends in axial length relative to the drive shaft 3 and forms with the later a slide bearing. The support sleeve 4 extends at least along a vertical length in which the drive shaft 3 is guided by at least a two point bearing. In this context, comparable supports are also conceivable by means of which the drive shaft is arranged in the support sleeve 4 to be at least partially rotatable.

The support sleeve 4 on its part is also rotatably supported in the stationary measuring gear drive housing 5. One end of the support sleeve 4 is connected with a support sleeve spur gear drive wheel 13 functioning as a driving device inside the gear drive housing 5. The support sleeve 4 is mounted by two ball bearings 14 in the gear drive housing 5. A sealing element 15 seals the support sleeve 4 in a dust tight manner relative to the impeller wheel housing 1. The sealing element 15 may also be integrated in the ball bearing 14 or it may be constructed as an O-ring seal. Neither the ball bearing 14 nor the sealing element 15 comes into contact with the measuring drive shaft 4. Therefore, the friction values of the sealing element 15 are negligible. As a result, the sealing element 15 can be so dimensioned that it provides primarily a superior sealing effect even relative to abrasive bulk material dusts.

A bevel gear drive is provided in the gear drive housing 5 for the common driving of the support sleeve 4 and the drive shaft 3. This feature permits advantageously a horizontal drive by means of which a small structural height is achievable. This bevel gear drive comprises a drive bevel gear wheel 16 driven by a motor not shown. The drive bevel gear 16 meshes with two further bevel gear wheels 17 and 18. The two bevel gear wheels 17 and 18 are arranged horizontally and opposite each other. The bevel gear wheel 17 is connected with an upper shaft 28. The bevel gear wheel 18 is connected with a lower shaft 29. An upper drive spur gear wheel 19, functioning as a separate drive means, is arranged on the upper bevel gear wheel shaft 28. The upper spur gear wheel 19 meshes with the sleeve drive spur gear wheel 13 to drive the support sleeve with a constant predetermined rpm.

The lower shaft 29 is also connected with a lower drive spur gear wheel 20 which meshes with an intermediate spur gear wheel 21. On the other hand the intermediate spur gear wheel 21 meshes at its horizontally opposite side with the drive spur gear wheel 11 to drive the later with a predetermined constant rpm which corresponds to the rpm of the support sleeve 4. This feature achieves, in the ideal case, that there is no relative velocity between the drive shaft 3 and the support sleeve 4 although both are rotatable oppositely to each other. The intermediate spur gear wheel 21 is connected with an intermediate shaft 22 which is supported by means of a ball bearing 23 in a horizontal force transmitting arm 24. This force transmitting arm is rotatably supported below the drive spur gear wheel 11 for rotation about a rotation point which is an extension of the rotation axis 27. The force transmitting arm 24 props itself radially with its other end on a force transducer 26. This force transducer 26 is advantageously constructed as a double bending beam or as a load cell of rotational symmetry on which the radially effective brake moment in the measuring train supports itself. Thereby, the measuring train comprises the impeller wheel 2, the drive shaft 3, the drive spur gear wheel 11, the intermediate spur gear wheel 21 with the intermediate shaft 22 and anti-friction ball bearing 23 as well as the force transmitting arm 24 which bears on the load cell 26. The load cell 26 is constructed as a strain gage pickup. Therefore the brake moment which is proportional to the mass flow is acquired through a small radial deflection of the intermediate spur gear wheel 21 and of the force transmitting arm 24. This radial deflection is proportional to the brake moment. These measurable distances at the load cell 26 are customarily within 0.1 to 0.5 mm.

Figure 2:
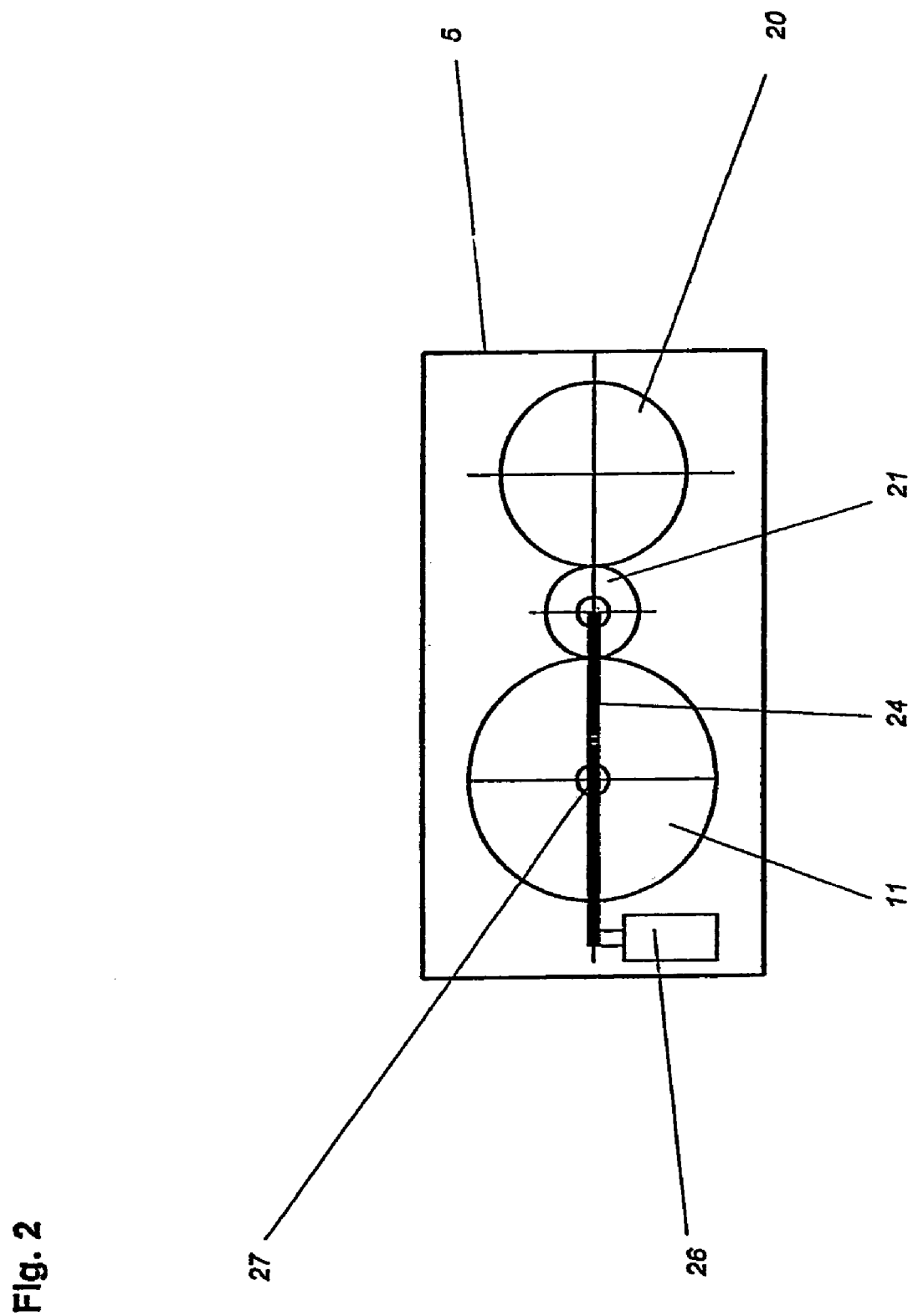
FIG. 2 is a schematic plan view of a measuring gear of a measuring device with a radial force transmission to a force transducer.

The function of the measuring device will be explained with reference to the plan view of the measuring gear according to FIG. 2. FIG. 2 shows the lower drive spur gear wheel 20 which meshes with the intermediate spur gear wheel 21 to drive the later. The intermediate spur gear wheel 21 meshes on its opposite horizontal side with the drive spur gear wheel 11 to drive the later with a constant rpm. In this connection, the intermediate spur gear wheel 21 is suspended with its mounting on elongated radially deflectable force transmitting arm 24 which is rotatably mounted in the rotation point perpendicularly to the rotation axis 27. The force transmitting arm 24 props itself radially on the force measuring device 26.

In an idling operation when there is no bulk material flow 9 guided onto the impeller wheel 2 it is merely necessary to provide a drive moment through the lower drive spur gear wheel 20, through the intermediate spur gear wheel 21 and through the drive spur gear wheel 11 that corresponds to the friction in the measuring train. Due to the fact that no friction occurs in this portion of the measuring train because the support sleeve 4 rotates in synchronizm with the drive shaft 3, only the bearing friction at the meshing intermediate spur gear wheel 21 and its bearings as well as at the bearings of the force transmitting arm 24 must be compensated. The frictions occurring in this portion are relatively small because these components of the measuring train run in slide means and because these components are driven with a relatively high rpm with minimal friction losses. In this portion of the measuring gear drive 5 normally no temperature variations worth mentioning occur so that viscosity differences of the slide means are negligible whereby a very constant idling operation friction moment occurs. This small friction moment is effective through the intermediate spur gear wheel 21 that is radially deflectable, with a constant idling operation drive moment on the force measuring device 26. This constant idling torque moment is compensated by taring the measuring device so that a high zero point constancy is achieved due to the friction free drive shaft mounting.

When a bulk material flow 9 is axially admitted on the impeller wheel 2, a radial acceleration of the bulk material flow 9 occurs due to the deflection whereby a Coriolis force generates an additional brake moment on the shaft 3. This brake moment is directly proportional of the mass flow. As a result, the intermediate spur gear wheel 21 that meshes with the drive shaft 3, is radially deflected and transmits this brake moment to the rotatably mounted force transmitting arm 24 onto the force transducer 26. Thus, the force acquired by the transducer represents a value for the mass flow 9 passing through the impeller wheel. The geometric dimensions of the impeller wheel 2 and the transmission ratios of the measuring gear drive 5 are known. Therefore, the feed advance rate or feeding quantity of the mass flow passing through the impeller wheel 2 becomes ascertainable and displayable with the aid of an evaluating unit not shown.

Theoretically it is assumable that with a constant drive rpm of the impeller wheel 2 the required drive torque moment is exactly proportional to the mass flow rate. In practice however this proportionality is influenced by additional brake moments which occur due to friction influences in the measuring train. Therefore the measuring accuracy is deteriorated particularly by variably friction influences because these are not ascertainable by calibration measures. Particularly viscosity differences in the slide bearings operating with sliding means are hard to ascertain because the viscosities depend on the external temperature or on the temperature of the bulk material. However, it has been found in practice that particularly the viscosity differences in the measuring gear drive are negligible because such Coriolis measuring devices are preferably used at room temperature whereby hardly any viscosity differences occur in the measuring gear drive. Further, contaminations hardly occur in the bearing area of the measuring gear drive area 5 because in that area no hard to accomplish bearing seals are required. Therefore, the friction in this area is practically constant.

However, strongly fluctuating moments occur at the impeller wheel mounting in the impeller wheel bulk material housing 1. These fluctuations are due to variable and non-symmetrically impinging bulk material flows 9 that generate phases of unbalanced rotations. As a result, unequal friction moments can occur also in air bearing mountings which are substantially friction free. This is so because in connection with a substantially uneven loading of the impeller wheel 2 partial imbalance effects can occur in the bearing area which in turn lead to short duration contacts in the bearing. Particularly the bearing friction varies frequently in the bulk material area due to the fact that in the long run the entry of bulk material dust is hard to prevent. Since the measured Coriolis forces are relatively small compared to the occurring imbalance forces, particularly such variations in the measuring train in the area of the impeller wheel housing bearing lead to relatively large measuring errors because in this area large unbalances occur and contaminations deteriorate the bearings.

This problem has been solved by the measure according to the invention by the feature that all friction influences are completely eliminated in the measuring train at the drive shaft support or bearing 12 and in the transition to the impeller wheel housing 1. This elimination is achieved in that no relative motion occurs in the bulk material space between the drive shaft bearing 12 and the support sleeve 4 due to the separate drive 13, 19 and 17 of the support sleeve 4 so that the drive shaft 3 is supported along its entire length free of friction. In this connection it is irrelevant what type of rotational support is provided between the drive shaft 3 and the support sleeve 4 so that simple supports can also be provided. On the other hand, the invention shifts the friction influences into the area between the outer jacket of the support sleeve 4 and the stationary housing section 5. Thus, basically the drive shaft 3 is decoupled from friction influences all the way into the impeller wheel housing 1 because the bearing support 14, 15 which is subject to friction, of the sleeve 4 is not arranged in the measuring train. It is therefore substantially impossible that friction influences at the seals 15 and entering bulk material dusts can influence the measuring accuracy. Therefore, temperature oscillations occurring in this area in the bulk material are basically negligible for the measuring accuracy because although the bearing friction between the support sleeve 4 and the drive gear housing 5 varies thereby but this variation does not influence the ascertainable drive moment which is effective on the force transducer 26 in the measuring train. Thus, it is possible advantageously to provide sealing measures that are subject to friction at the bearing 14 between the sleeve 4 and the drive gear housing section 5. Such sealing measures assure a permanent sealing for bulk materials with strongly abrasive dust components. The friction free drive shaft bearing 12 according to the invention also particularly improves the measuring accuracy for large mass flows 9 even through the relatively large rpm of the impeller wheel tends to cause imbalances even for small bulk material fluctuations and for uneven impeller wheel loadings. This measuring accuracy improvement is assured because the imbalances cannot become effective in the measuring train. Thus, the invention has the additional advantage that the measuring device can be operated at a relatively high impeller wheel rpm so that even with a compact construction high flow rates are achievable. Furthermore, such a friction free bearing 12 of the measuring train all the way into the impeller wheel housing permits a small drive spur gear wheel diameter relative to the impeller wheel diameter. The small drive spur gear wheel diameter permits achieving a higher measured signal yield because friction dependent brake moment fluctuations do not occur in the measuring train. As a result, even for small bulk material flows 9 a high zero point constancy is assured.

Figure 3:
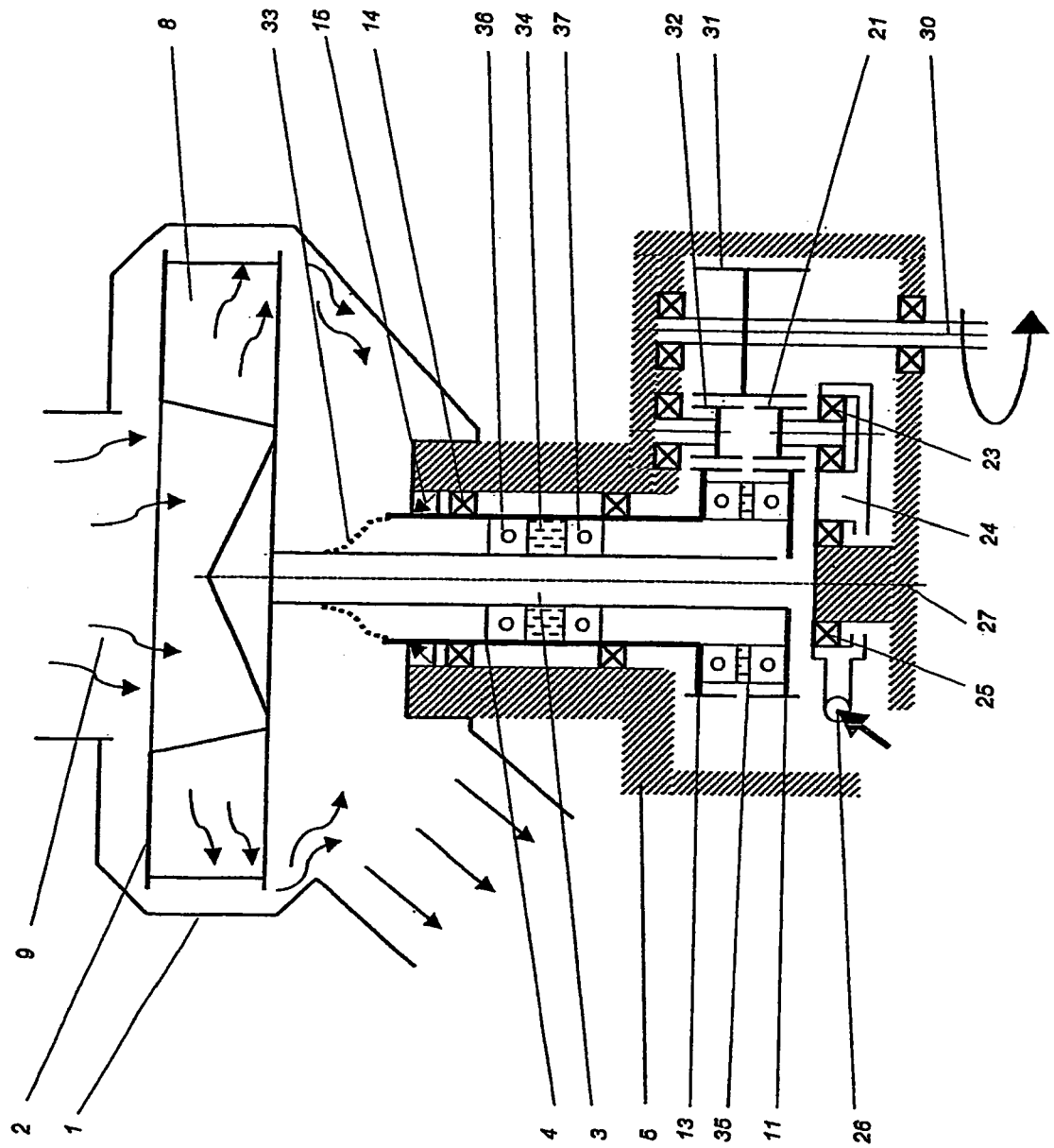
FIG. 3 is a sectional side view of a schematically illustrated measuring device with a drive shaft mounted by leaf springs.

A further advantageous embodiment of the invention is shown in FIG. 3 of the drawing. The invention according to the example embodiment of FIG. 3 distinguishes itself from the example embodiment of FIG. 1 primarily in that the slide bearing 12 between the drive shaft 3 and the support sleeve 4 has been replaced by the arrangement of special leaf spring elements 34, 35. In the embodiment of FIG. 1 of the drawing a small relative motion between the rotating shaft 3 and the support sleeve 4 occurs, even when the rotating shaft 3 and the support sleeve 4 rotate with the same rpm when there is a change in the mass flow. This small relative motion is transmitted to the force measuring device 26 for a measured signal acquisition. When the mass flow 9 through the impeller wheel 2 remains constant, the drive shaft 3 and the support sleeve 4 rotate in exact synchronism so that in such a measuring operation there is no relative motion between the drive shaft 3 and the sleeve 4. However, when a change occurs in the mass flow 9, a larger or smaller brake moment also occurs which is effective on the force measuring device 26. Since the device 26 is constructed as a strain gage measuring pickup, the force change is not acquired without a displacement. Rather, the force effect leads to a displacement change in the deformation body of the force transducer 26. This displacement change in such force transducers 26 or load cells amounts to between 0.1 and 0.5 mm and causes a relative motion or rotation of the drive shaft 3 relative to the support sleeve 4. Depending on the dimensions of the gear wheel diameters and on the lever arm length of the force transmitting arm 24 relative angular displacements may thereby occur within one to three degrees. When a mass flow rate change occurs, which causes a relative angular displacement the bearing surfaces of the slide or anti-friction bearings must be moved out of their rest position. For this purpose a so called "tear off moment" must be overcome.

This "tear off moment" occurs for example in slide and anti-friction bearings at a starting motion out of a rest position due to a high friction number. All such bearings mentioned above have the characteristic that first a high friction moment must be overcome which sinks to a minimum in response to an increasing relative motion or rpm, in order to then rise again slightly. This "tear off moment" has a strongly non-linea characteristics from the relative motion zero to a maximal relative motion. Therefore, this so called "tear off moment" can lead particularly in connection with small feed rate variations to a measuring inaccuracy which should be avoided in many instances.

Furthermore, the slide and anti-friction bearings always have a certain bearing play dependent on the construction. Such bearing play leads, particularly in connection with small mass flow variations close to an idling operation, to an instability in the zero point which is not tarable and constitutes a measuring inaccuracy. Thus, the further embodiment of the invention suggests to provide at least three leaf spring elements 34, 35 as a spring element bearing between the support sleeve 4 and the drive shaft 3. These leaf spring elements are soft against bending in the direction of rotation and stiff against bending in the tangential and axial direction. Such spring elements 34, 35 have the advantage that they do not have any bearing play and have a linear elastical characteristic in the direction of rotation so that even for small bulk material fluctuations a relative motion of the shaft 3 to the support sleeve 4 occurs which is proportional to the mass flow.

The example embodiment of the measuring device according to FIG. 3 of the drawing functions as follows:

A double drive spur gear wheel 31 is driven with a constant rpm by a vertically arranged drive 30. The spur gear wheel 31 drives an upper intermediate spur gear wheel 32 as a separate drive means and a lower intermediate spur gear wheel 21. The upper and lower spur gear wheels 32 and 21 have the same diameter and mesh with the drive spur gear wheel 11, 13 of the drive shaft 3 and the support sleeve 4. Thereby the support sleeve 4 and the drive shaft 3 are driven with the same rpm so that basically no relative motion occurs between the two. The support sleeve 4 is rotatably mounted by two ball bearings 14 and sealing means 15 in a stationary gear housing 5 and led all the way into the impeller wheel housing 1. The support sleeve 4 is sealed in the impeller wheel housing 1 by an elastic rubber bellows seal 33 against entering bulk materials or bulk material dusts. The rubber bellows 33 is at least bending elastic in the rotational direction.

At a mass throughflow of bulk materials 9 the latter produce a brake moment on the impeller wheel 2 which moment is proportional to the mass throughflow. This brake moment is effective on the drive shaft 3 which is driven by the intermediate spur gear wheel 21 which is suspended in a radially movable manner. The intermediate spur gear wheel 21 props itself about the rotation point 27 radially on the force measuring device 26. The force measuring device 26 is a load cell equipped with strain gages. The load cell permits a radial motion of about 0.1 to 0.5 mm in response to a force effect. Thereby a certain relative motion of the drive shaft 3 and the support sleeve 4 is necessary during the measuring operation. This relative motion is assured substantially free of friction by the spring elements 34 arranged in the measuring train. Therefore a support or bearing formed by at least three leaf spring elements 34 is preferably provided in the upper area of the support sleeve 4 close to the impeller wheel housing. The spring elements 34 are preferably made of an elastic spring steel which is arranged symmetrically around the drive shaft 3. These leaf spring elements 34 are made of a thin spring steel sheet metal having a thickness of preferably 0.5 to 1.5 mm. The spring steel sheet metal is elastic and soft against bending in the bending direction. The spring elements 34 are rigid in the radial direction and thus stiff against bending so that the drive shaft 3 as well as the support sleeve 4 rotate about a stable rotation axis 27. For this purpose the spring elements 34 are screwed at the upper end to a mounting flange 36 or mounting ring which is connected with the drive shaft 3. The lower end is connected to a further drive flange 37 to drive ring which is connected with the support sleeve 4.

At least three further spring leaf elements 35 are arranged between the drive spur gear wheel 11 of the shaft 3 and the support sleeve drive spur gear wheel 13 for improving the support and guiding of the drive shaft 3. These additional leaf spring elements are also soft against bending in the bending direction and stiff against bending in the radial and axial direction. Due to the two axially spaced leaf spring bearings 34 and 35 the drive shaft 3 is angularly displaceable relative to the support sleeve 4 by up to 5°. This angular displacement is sufficient for utilizing the radial measuring displacement of the load cell 26. The leaf spring bearings have in the relevant range a constant spring rate in the rotation direction which spring rate can be compensated when the measured signal is evaluated. Since this leaf spring bearing 34, 35 is free of friction even when an angular displacement out of the rest position is present between the support sleeve 4 and the drive shaft 3, very high measuring accuracies are possible even for very low bulk material variations. This feature applies preferably also to very small mass flows, the brake moment of which distinguishes itself insignificantly from the idling brake moment. Such a measuring device thus also has an improved zero point constancy and this is true particularly for small drive spur gear wheel diameters relative to the impeller wheel diameter.

In this further advantageous embodiment of the invention frictions in the measuring train occur merely at the intermediate spur gear wheel 21 and the rotation point bearing 25 of the force transmitting arm 24. Since the bearings of the intermediate spur gear wheel 21 are driven with a constant rpm, these are drivable at their friction minimum and they are constant at least when normal room temperature prevails so that they can be compensated by a calibration. In connection with the rotation point ball bearing 25, which is subject to relatively large friction values at a rotation motion out of a starting position, the friction moment however, may be disregarded due to the large lever arm lengths to the rotation point 27. However, in a further advantageous embodiment this bearing 25 may be provided by leaf spring elements due to the small angular displacement. In such an example embodiment only one ball bearing 23 subject to friction is present at the intermediate spur gear wheel 21 in the measuring train. This measuring train includes the impeller wheel 2, the drive shaft 3 with the drive spur gear wheel 11, the intermediate spur gear wheel 21, with its bearing at the lever arm 24 and the following rotation point bearing 25 as well as the load cell 26. Since the ball bearing 23 is operable in a relative constant temperature range and with a friction minimum, the friction can change only as a result of wear and tear. Further, this bearing is located in an enclosed gear housing 5 whereby it is substantially protected against abrasive contaminations so that these friction variations are negligible.

It has been found that, in practice, a cost advantageous alternative to the leaf spring bearings 34, 35 is an elastomer of synthetic or rubber materials which are secured between the support sleeve 4 and the drive shaft 3. These elastomeric materials however must have such characteristics that they are soft to bending in the rotational direction at a maximum angular displacement and stiff against bending in the radial and axial direction. Drive chains, gear belts or comparable power transmission means may be used for driving the support sleeve 4 and the intermediate spur gear wheel 21. In this connection separate drives may be provided for the support sleeve 4 and for the drive shaft 3 provided the separate drives can be operated in synchronism with each other.

The invention claimed is:

1. An apparatus for measuring a flow rate of a mass flow of bulk material, said apparatus comprising an impeller wheel (2) in a housing (1), a drive shaft (3) for supporting and driving said impeller wheel (2) with a constant rpm in said housing, whereby said mass flow admitted to said impeller wheel is deflected and a radial and tangential velocity component is imposed on said mass flow, said apparatus further comprising a drive spur gear wheel (11) secured to said drive shaft (3), an intermediate spur gear wheel (21) meshing with said drive spur gear wheel (11), a further drive spur gear wheel (20, 31) meshing with said intermediate spur gear wheel (21), a force measuring device (26) holding the intermediate spur wheel in place, a support sleeve (4) coaxially surrounding said drive shaft (3), said support sleeve reaching into said housing (1) of said impeller wheel (2), said apparatus further comprising separate drive means (19, 32) for rotating said support sleeve (4) with an rpm corresponding to said constant rpm of said drive shaft (3), and a stationary housing section (5) wherein said support sleeve (4) is rotatably mounted.

2. The apparatus of claim 1, wherein said support sleeve (4) is constructed as a tube coaxially surrounding said drive shaft (3) for rotatably supporting and guiding said drive shaft (3).

3. The apparatus of claim 1, further comprising a two point bearing (14) rotatably mounting said support sleeve (4) in said stationary housing section (5), and sealing means (15) provided at least relative to said housing (1) of said impeller wheel (2), said sealing means (15) preventing penetration by mass particles including bulk material dust.

4. The apparatus of claim 1, further comprising a driving mechanism (13) for said support sleeve (4), said driving mechanism being driven by said separate drive means (19, 32) with said constant rpm.

5. The apparatus of claim 1, further comprising a first drive train (19) for rotating said support sleeve (4), a second drive train (21) for rotating said drive shaft (3) and a common drive (16, 30) for driving said first and second drive trains, wherein said second drive train for said drive shaft (3) comprises an intermediate spur gear wheel (21), and wherein said first drive train for said support sleeve (4) includes any one of an upper intermediate spur gear wheel (32), an upper drive spur gear wheel (19), a drive chain, and a gear belt drive.

6. The apparatus of claim 5, further comprising a force transmitting arm (24) and a force measuring device (26) wherein said intermediate spur gear wheel (21) connected to the drive shaft (3), is rotatably mounted on said force transmitting arm (24) which is radially deflectable and which supports itself on said force measuring device (26).

7. The apparatus of claim 1, further comprising a bearing device rotatably supporting said drive shaft (3), said bearing device including any one of a slide bearing (12), a bearing of spring elements (34, 35), and an elastomer bearing for rotatably supporting said drive shaft (3) inside said support sleeve (4), said spring elements (34, 35) and said elastomer bearing being soft against bending in the direction of rotation and stiff against bending in the radial and axial directions.

8. The apparatus of claim 1, further comprising at least one of a rubber bellows seal and a labyrinth seal (33) for sealing said drive shaft (3) relative to said housing (1) of the impeller wheel (2) and relative to said support sleeve (4).

9. The apparatus of claim 6, wherein said force transmitting arm (24) is rotatably mounted about a pivot point (27), said apparatus further comprising any one of a low friction slide bearing, a ball bearing (25) and a spring element bearing for rotatably mounting said force transmitting arm.

10. The apparatus of claim 9, wherein said spring element bearing comprises at least three vertically arranged leaf spring elements (34, 35) which are connected in a horizontal plane (36, 37) with said drive shaft (3) or with said support sleeve (4).

11. The apparatus of claim 1, further comprising a mounting for said drive shaft (3), said mounting comprising at least two axially spaced spring element bearings (34, 35), and wherein one of said spring element bearings (35) is positioned between a drive spur gear wheel (14) and a spur gear wheel (13) for driving said support sleeve (4).

* * * * *